Aug. 22, 1961  O. E. ROSS ET AL  2,996,764
METHOD OF MOLDING PLASTIC ARTICLES FROM TWO
OR MORE PLASTIC MATERIALS
Filed Dec. 3, 1956

INVENTORS.
Oren E. Ross
BY William W. Grinnell

Griswold & Burdick
ATTORNEYS

2,996,764
METHOD OF MOLDING PLASTIC ARTICLES FROM TWO OR MORE PLASTIC MATERIALS
Oren E. Ross and William W. Grinnell, Midland, Mich., assignors to The Dow Chemical Company, Midland, Mich., a corporation of Delaware
Filed Dec. 3, 1956, Ser. No. 626,026
4 Claims. (Cl. 18—59)

This invention concerns a method of molding organic plastics to produce fabricated articles composed of a plurality of thermoplastic materials and relates to the new products obtainable by said method.

U.S. Patent No. 2,313,985 describes a method of molding plastics to produce a final product having a smooth, hard, abrasion-resistant surface, wherein a composite organic plastic sheet or film, one side of which is hard, non-tacky and abrasion-resistant so that it will not adhere to the mold walls and the other side of which is capable of becoming soft and tacky and which is preferably of a composition compatible with the plastic to be molded, enabling it to adhere to, or at least partly merge with, the surface of the plastic being molded under the heat and pressure conditions employed, is placed in a mold as a lining and a thermoplastic molding material is then injected into the mold through a sprue opening and into contact with the adhesive side of the composite sheet or film lining which latter becomes thoroughly bonded to, or partly fused with the injected material to form a product having a smooth, hard, abrasion-resistant surface.

The method has certain disadvantages in the manufacture of composite plastic articles having a continuous surface coating or outer layer of a desired thermoplastic material. Care must be taken to leave an opening in the film or sheet lining adjacent to the sprue opening to allow the plastic to be molded to enter the mold cavity between the two films, and when the article to be molded is irregular in shape the film must be drawn so that it fits snugly the irregular shaped portion of the mold. Such operations are time-consuming, costly and are generally unsatisfactory.

It is a primary object of the invention to provide an improved method of molding organic plastics to produce fabricated articles composed of a plurality of thermoplastic materials. Another object is to provide a method of making fabricated articles composed of a plurality of thermoplastic materials in continuous layers each substantially surrounding and integrally united with another body or layer of thermoplastic material. A further object is to provide new plastic articles comprising a composite plurality of continuous layers of thermoplastic materials substantially surrounding and integrally united with one another in a molded product. Other and related objects may appear from the following description of the invention.

According to the invention the foregoing and related objects are obtained by forcing into a mold cavity a quantity of a thermoplastic material comprising an organic polymer in a heat-plastified condition insufficient to fill said cavity, then forcing another heat-plastified thermoplastic material comprising an organic polymer into the mold cavity through the same port and into contact with the softened thermoplastic material previously fed to the mold, continuing the successive forcing of at least one such heat-plastified thermoplastic material to the mold cavity through said port in total amount sufficient to fill the mold cavity under pressure of the plastic material against walls defining said cavity to form a composite product, and thereafter cooling the material within said mold, preferably under pressure, and effecting or removing the composite molded product.

By forcing a molten or heat-plastified thermoplastic material such as an organic polymer in a flowable condition under pressure into a mold cavity in an amount sufficient to form a continuous layer upon walls defining said cavity and insufficient to fill the mold, e.g. in amounts corresponding to from 20 to 80 percent of the volume of the mold cavity, so that the material resides as a heat-plastified or softened mass adjacent to the inlet port, then forcing or feeding another quantity of the same or a different heat-plastified thermoplastic material into the mold cavity through the same inlet port, the material later entering the mold cavity penetrates the interior of the mass of the material previously fed to the mold cavity and expands it by pressure resulting from the increasing mass of the last material being forced into the mold cavity. The continued feed of plastic material to the mold in total amount sufficient to fill the mold cavity results in the formation of a composite article composed of an outer continuous layer of the first plastic material fed to the mold, surrounding an inner layer or body of the second plastic material fed to the mold. Composite articles composed of two, three, four or more thermoplastic materials can be prepared by the method.

The forcing of the molten or heat-plastified thermoplastic material into the mold cavity can be carried out employing injection or extrusion molding operations, preferably the latter. It is important that the first thermoplastic material in a heat-plastified and flowable condition be forced into the mold cavity at a rate which allows the softened material to form a body of the same adjacent to the inlet port and in amount insufficient to fill the mold. Upon forcing a further quantity of the same or a different thermoplastic material in a flowable condition into the mold cavity through the same inlet port, the body of the heat-plastified material previously fed to the mold is expanded or "blown" from within and is pressed against walls defining the mold cavity when the mold is filled. The molded article thus acquires the desired shape. The second or later plastic material fed to the mold is confined as an inner body of the composite molded article, or as an intermediate layer of the same when three or more thermoplastic materials are employed in making a composite article. It is also important that the forcing of the successive thermoplastic material(s) into the mold cavity be carried out at a rate which permits the softened plastic material previously fed to the mold to envelop the later fed material so that the envelope is not ruptured upon expanding. Thus, the plastic material in the mold is expanded to completely fill the mold and form a composite article composed of a plurality of thermoplastic materials. For these reasons, the process is preferably carried out employing a plastics extruder for feed of the thermoplastic materials to the mold cavity.

Any thermoplastic material comprising an organic polymer which can be molded by injection or extrusion molding operations is adapted to be used according to the invention. Suitable thermoplastic materials are the polymers and copolymers of vinyl and vinylidene compounds, cellulose ethers and esters, natural and synthetic rubber or compositions, comprising such thermoplastic materials and pigments, fillers, dyes, colors, plasticizing agents, lubricants, stabilizers, mold release agents, etc., or mixtures of any two or more of the thermoplastic resin materials. The thermoplastic materials should have flow temperatures which will not deleteriously affect one another under the conditions employed.

The thermoplastic materials preferably comprise organic polymers compatible with one another enabling said materials to adhere to, or at least partially merge with, each other at the contacting surfaces. Such thermoplastic materials may comprise, for example, ethyl cellulose not plasticized or slightly plasticized and a softer heavily plasticized composition of the ethyl cellulose;

polystyrene and a copolymer of styrene with from 2 to 10 percent by weight of rubber; polyethylene and a tough mechanically blended composition of polyethylene and rubber; polystyrene and a copolymer of styrene and methylmethacrylate; polymethylmethacrylate and a copolymer of styrene and methylmethacrylate; polystyrene and a copolymer of styrene and alpha-methyl styrene; or polystyrene and a copolymer of styrene and acrylonitrile.

The method is advantageously employed in molding relatively large plastic articles such as building blocks, plates, panels, covers, etc. Such articles having a surface of a desired thermoplastic material and a core comprising one or more other thermoplastic material, e.g. a thermoplastic polymer and filler, can readily be fabricated or molded according to the invention.

Reference is made to the accompanying drawing, in which for clarity, certain features are shown on a somewhat exaggerated scale.

Figure 1:
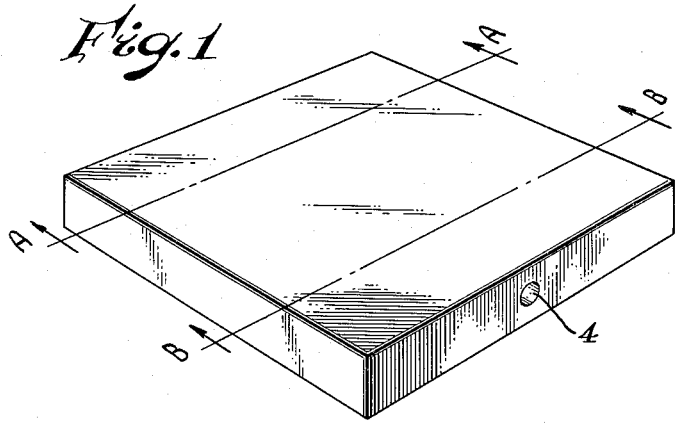
FIG. 1 represents a flat molded article composed of a plurality of thermoplastic materials prepared according to the invention.

Referring to FIG. 1, the composite molded article consists of an outer continuous surface or layer of one organic thermoplastic material, except for the small area 4 which was adjacent to the inlet port of the mold in which the article was made, and a core composed of a second organic thermoplastic material.

Figure 2:
FIGS. 2 and 3 are cross-sections of the molded article taken along the lines A—A and B—B, respectively.
Figure 3:

FIGS. 2 and 3 are cross-sections of the molded article of FIG. 1 taken at different distances from the area 4 which was adjacent to the inlet port of the mold and shows the general distribution of the thermoplastic materials in the molded article.

In general, the molded articles have a core of thermoplastic material which is of somewhat greater cross-section at points adjacent to the sprue and diminishing in cross-sectional area at points farther from the sprue. The invention provides a new and improved method for molding composite articles composed of two or more thermoplastic materials, which articles are useful for a variety of purposes, e.g. building blocks, panels or covers, and permits the manufacture of fabricated articles having a smooth hard abrasion-resistant surface and a tough shock-resistant core or a core made of a less costly thermoplastic material than the outer covering.

The following examples illustrate ways in which the principle of the invention has been applied, but are not to be construed as limiting its scope.

Example 1

Molding grade polystyrene was fed to a plastics extruder wherein it was heat-plastified and extruded at a temperature of about 420° F. at a rate corresponding to 21 pounds of the molten polystyrene per hour. A charge of about 1.25 pounds of the heat-plastified polystyrene was fed into a mold, having a cavity consisting of an annular space surrounding a cylindrical center in a chamber 14 x 14 inches square by 1 inch deep, through a sprue opening ⅜ inch in diameter in one edge of the mold. The charge of molten polystyrene fed to the mold was about 20 percent of the total volume of the mold cavity. The mold was heated at a temperature of 320° F. Immediately, following feed of the heat-plastified polystyrene into the mold cavity, a heat-plastified composition consisting essentially of a copolymer of 95 percent by weight of styrene and 5 percent of GR–S type 1006 rubber (a copolymer of about 76.5 percent by weight of butadiene and 23.5 percent of styrene) pigmented with carbon black was forced into the mold cavity through the same sprue opening at a rate of about 21 pounds per hour by means of a plastics extruder pressing said heat-plastified composition at a temperature of 420° F. and between 1000 and 1500 pounds per square inch gauge pressure. Feed of the heat-plastified composition was continued until the mold cavity was completely filled. Thereafter, the plastic material in the mold was cooled while maintaining the pressure. The mold was opened and the molded article removed. The molded article was composed of a continuous outer layer of the clear polystyrene surrounding and integrally united with an inner core of the black pigmented styrene-rubber copolymer composition, except for the small area which was adjacent to the sprue opening in the mold in which it was prepared. The clear polystyrene first fed to the mold cavity was expanded or "blown" by the pigmented composition without rupture of the envelope as the mold cavity was filled.

Example 2

Polyethylene was fed to a plastics extruder wherein it was heat-plastified and extruded at a temperature of 350° F. and at a rate of about 20 pounds of the melted polyethylene per hour. A charge of about 1.25 pounds of the molten polyethylene was fed into a mold similar to that employed in Example 1 through a sprue opening having a diameter of ⅜ inch while maintaining the mold at a temperature of 320° F. The charge of the molten polyethylene was about 20 percent of the total volume of the mold cavity. Immediately following feed of the molten polyethylene into the mold cavity, a heat-plastified polystyrene composition consisting essentially of polystyrene containing a brown pigment and at a temperature of 420° F. was forced into the mold cavity through the same sprue opening at a rate of 20 pounds per hour by means of a plastics extruder pressing said heat-plastified polystyrene composition at between 1000 and 1500 pounds per square inch gauge pressure until the mold was completely filled. The plastic material in the mold was cooled while maintaining the pressure. Thereafter, the mold was opened and the molded article was removed. The product was a composite article consisting of an inner core of the polystyrene composition surrounded by a thin outer layer of the polyethylene.

Example 3

Polymethylmethacrylate was heat-plastified in a plastics extruder. A charge of 1.25 pounds of the molten material at a temperature of 420° F. was fed into a mold similar to that described in Example 1 and maintained at a temperature of 320° F. Immediately following feed of the heat-plastified polymethylmethacrylate to the mold cavity, a heat-plastified polystyrene composition consisting of polystyrene containing a small amount of brown pigment was forced into the mold cavity through the same sprue opening by means of a plastics extruder pressing said heat-plastified polystyrene composition at between 1000 and 1500 pounds per square inch gauge pressure at a temperature of 420° F. until the mold cavity was completely filled. Thereafter, the plastic material in the mold was cooled while maintaining the pressure. The mold was opened and the molded article removed. The molded article was composed of an outer layer of the clear polymethylmethacrylate surrounding an inner core of the brown polystyrene.

We claim:

1. A method of making a fabricated article comprising a plurality of thermoplastic materials, which method comprises molding said materials by forcing a thermoplastic material comprising an organic polymer in a heat-plastified flowable condition and under pressure into a closed mold cavity through an inlet port to form a body of the heat-softened polymer surrounding said port in amount corresponding to that sufficient to form a continuous layer of said polymer upon walls defining said mold cavity and insufficient to fill said cavity, then forcing another heat-plastified thermoplastic material comprising an organic polymer in a flowable condition and under pressure into the mold cavity through the same port and into contact with the flowable heat softened material previously fed to said mold, said thermoplastic materials having flow temperatures which will not deleteriously affect one another under the conditions employed, continuing the successive feed of at least one such heat-plastified thermoplastic material in a flowable condition into the mold cavity under pressure through said port in total amount sufficient to fill the mold and expand the plastic material first forced into the mold cavity under pressure of the plastic material later forced into the mold cavity against walls defining said mold cavity and thereafter cooling the material under pressure within said mold, then releasing the pressure and removing the molded article.

2. A method of making a fabricated article comprising a plurality of thermoplastic materials, which method comprises molding said materials by forcing a thermoplastic organic polymer in a heat-plastified flowable condition and under pressure into a closed mold cavity through an inlet port to form a body of the heat-softened polymer surrounding said port in amount corresponding to that sufficient to form a continuous layer of said polymer upon walls defining said mold cavity and insufficient to fill said cavity, then forcing another heat-plastified thermoplastic material comprising an organic polymer in a flowable condition and under pressure into the mold cavity through the same port and into contact with the flowable heat-softened polymer previously fed to the mold, said thermoplastic material later forced into said mold cavity in a flowable condition under pressure having a flow temperature which will not deleteriously affect said organic polymer previously forced into the mold cavity under the conditions employed, and continuing the successive forcing of at least one such heat-plastified thermoplastic material in a flowable condition under pressure into the mold cavity through said port in total amount sufficient to fill the mold and to expand the heat-softened materials previously fed to the mold cavity under pressure against one another within the mold cavity and to expand the plastic material first forced into the mold cavity under pressure of the plastic material later forced into the mold cavity against walls defining said cavity to coherently unite the materials with one another in discrete layers and produce a composite product, and thereafter cooling the material under pressure within said mold, then releasing the pressure and removing the molded article.

3. A method of making a fabricated article comprising a plurality of thermoplastic materials, which method comprises molding said materials by forcing a thermoplastic material comprising polystyrene in a heat-plastified flowable condition and under pressure into a closed mold cavity through an inlet port to form a body of the heat-softened polymer surrounding said port in amount corresponding to from 20 to 80 percent of the total volume of said mold cavity, then forcing another heat-plastified thermoplastic material comprising polystyrene in a flowable condition and under pressure into the mold cavity through the same port and into contact with the flowable heat-softened polystrene previously fed to the mold, continuing the successive forcing of at least one such heat-plastified thermoplastic material comprising polystyrene in a flowable condition into the mold cavity under pressure through said port in total amount sufficient to fill the mold cavity and expand the plastic material first forced into the mold cavity under pressure of the plastic material later forced into the mold cavity against walls defining said cavity and cooling the material within said mold while maintaining the pressure, then releasing the pressure and removing the molded article.

4. A method as claimed in claim 3, wherein the fabricated article is prepared by the successive forcing of at least three of said thermoplastic materials in a heat-plastified flowable condition into said mold cavity under pressure.

References Cited in the file of this patent

UNITED STATES PATENTS

| | | |
|---|---|---|
| 1,454,939 | Michaelsen | May 15, 1923 |
| 1,918,127 | Pfeiffer | July 11, 1933 |
| 2,128,239 | Ferngren | Aug. 30, 1938 |
| 2,313,985 | Bradshaw | Mar. 16, 1943 |
| 2,371,709 | Rineer | Mar. 20, 1945 |
| 2,428,977 | Mares | Oct. 14, 1947 |
| 2,444,059 | Neher et al. | June 29, 1948 |
| 2,454,910 | Carr | Nov. 30, 1948 |
| 2,498,652 | Daly | Feb. 28, 1950 |
| 2,565,803 | Danielson et al. | Aug. 28, 1951 |
| 2,568,491 | Edwards | Sept. 18, 1951 |
| 2,697,854 | Boasson et al. | Dec. 28, 1954 |
| 2,710,987 | Sherman | June 21, 1955 |
| 2,719,330 | Stott | Oct. 4, 1955 |
| 2,803,041 | Hill et al. | Aug. 20, 1957 |
| 2,872,766 | Meissner | Feb. 10, 1959 |

FOREIGN PATENTS

| | | |
|---|---|---|
| 1,159,247 | France | Feb. 1958 |